United States Patent
Scordato et al.

(10) Patent No.: US 6,986,441 B2
(45) Date of Patent: Jan. 17, 2006

(54) FLUID DISPENSER CALIBRATION SYSTEM AND METHOD

(75) Inventors: Joseph John Scordato, Rockton, IL (US); James J. Minard, South Beloit, IL (US); Roger Roady, Roscoe, IL (US)

(73) Assignee: Carrier Commercial Refrigeration, Inc., Syracuse, NY (US)

( * ) Notice: Subject to any disclaimer, the term of this patent is extended or adjusted under 35 U.S.C. 154(b) by 181 days.

(21) Appl. No.: 10/296,186

(22) PCT Filed: Oct. 23, 2002

(86) PCT No.: PCT/US02/33937

§ 371 (c)(1),
(2), (4) Date: Nov. 21, 2002

(87) PCT Pub. No.: WO2004/038219

PCT Pub. Date: May 6, 2004

(65) Prior Publication Data

US 2004/0104242 A1 Jun. 3, 2004

(51) Int. Cl.
    *B67D 5/08* (2006.01)

(52) U.S. Cl. .............................. 222/63; 222/1; 222/14; 417/42

(58) Field of Classification Search ............... 222/63, 222/14, 504, 1, 129.1; 417/44.1, 42, 12; 73/863.01, 73/863.03
See application file for complete search history.

(56) References Cited

U.S. PATENT DOCUMENTS

| 4,137,913 | A | * | 2/1979 | Georgi .......................... 604/67 |
| 4,392,849 | A | * | 7/1983 | Petre et al. .................... 604/66 |
| 4,468,219 | A | * | 8/1984 | George et al. ................. 604/66 |
| 4,715,786 | A | * | 12/1987 | Wolff et al. .................... 417/22 |
| 4,820,281 | A | * | 4/1989 | Lawler, Jr. .................... 604/253 |
| 4,910,682 | A | | 3/1990 | Wolff et al. |
| 5,024,347 | A | | 6/1991 | Baldwin |
| 5,947,692 | A | | 9/1999 | Sahlin et al. |

OTHER PUBLICATIONS

PCT International Search Report, dated Jun. 24, 2003.

* cited by examiner

*Primary Examiner*—Frederick C. Nicolas
(74) *Attorney, Agent, or Firm*—Carlson, Gaksey & Olds

(57) ABSTRACT

A system and method for calibrating fluid detects an actual fluid dispensing characteristic, such as dispensing speed, and automatically adjusts the dispensing characteristic to match an ideal dispensing characteristic. The adjustment is conducted by a controller that controls fluid dispensing based on a function that correlates dispensing speed, a dispensed volume, and a dispensing time. The function allows calibration to occur automatically by converging system operation to the ideal dispensing characteristic, without requiring a user to calibrate the system through manual iterative methods.

17 Claims, 3 Drawing Sheets

FLUID DISPENSER CALIBRATION SYSTEM AND METHOD

TECHNICAL FIELD

The present invention relates to fluid delivery systems, and more particularly to a system that can be calibrated to dispense a predetermined volume of fluid.

BACKGROUND OF THE INVENTION

Many applications require fluid delivery systems that can dispense units of fluid having a predetermined volume. Fluid delivery systems often use a motor whose speed controls the volume of fluid dispensed at one time. For example, a peristaltic fluid delivery system includes a rotating roller that squeezes flexible tubing at selected intervals, thereby pushing generally equal units of fluid along the tubing for output. The motor controls the roller's rotation speed, thereby controlling the volume of fluid dispensed each time the roller squeezes the flexible tube; the faster the motor speed, the greater the volume of fluid output in a given time period.

When the system is initially installed, or when a user wishes to change the operating parameters (e.g., dispensed volume, dispensing speed, etc.), the system is calibrated to dispense the selected volume of fluid in each unit. Normally, calibration requires dispensing of a single unit of fluid, measuring the volume of the dispensed unit, and adjustment of the motor speed by, for example, manually adjusting a potentiometer controlling motor speed. These steps are repeated until the system dispenses a unit having the desired volume. Because current systems require manually iterative adjustments to obtain the desired fluid volume in each unit, calibration tends to be a tedious, labor-intensive process.

There is a desire for a fluid delivery system and method that can reliably deliver measured units of fluid having a desired volume without requiring manual, iterative adjustments during system calibration. There is also a desire for a calibration system and method that allows calibration based on a desired dispensing time.

SUMMARY OF THE INVENTION

The present invention is directed to a calibration system that can automatically calibrate a fluid dispensing system based on a detected flow rate. The invention detects an actual fluid dispensing characteristic, such as dispensing speed, and automatically adjusts the dispensing characteristic to match an ideal dispensing characteristic. The adjustment is conducted by a controller that controls fluid dispensing based on a function. The correlates various dispensing characteristic factors, such as dispensing speed, a dispensed volume, and dispensing time.

In one embodiment, an actuator control automatically adjusts based on a function obtained from dispensed liquid volumes obtained at various motor speeds over a fixed time period. This information is used to compute a correction amount to correct an actual speed to an ideal speed. The correction amount allows the dispenser to change its operation so that a target fluid volume is dispensed within a target dispensing time, regardless of the initial actual speed. The actual speed may be obtained initially by detecting the time period required to obtain the target volume. This time period is then compared with the function to detect the actual speed and obtain a corresponding correction amount.

The function used for calibration allows calibration to occur automatically by converging system operation to the ideal dispensing characteristic, without requiring a user to calibrate the system through manual iterative methods.

DETAILED DESCRIPTION OF THE EMBODIMENTS

Figure 1:
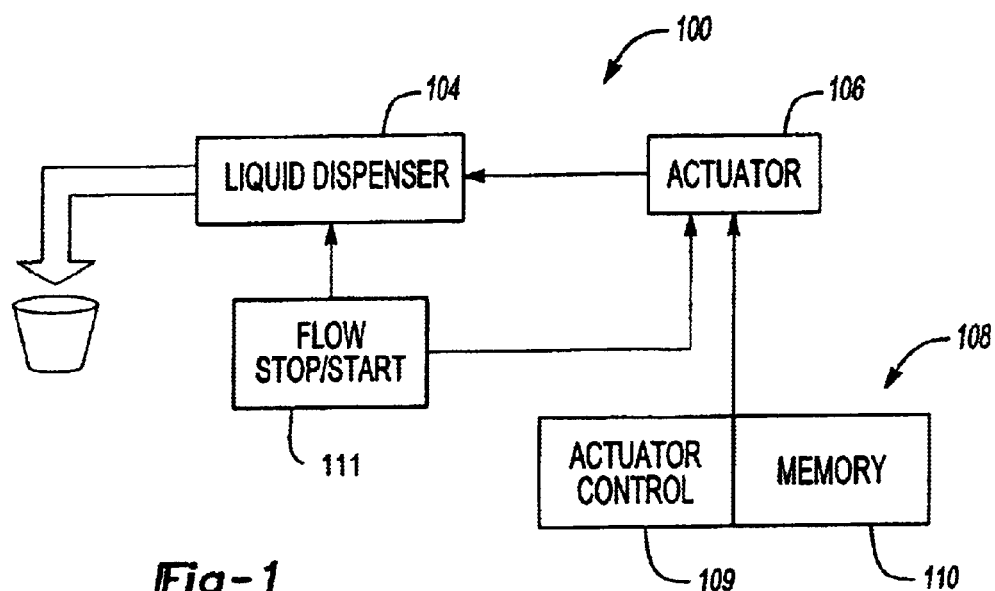
FIG. 1 is a representative block diagram illustrating a fluid dispensing system according to one embodiment of the invention.

FIG. 1 is a representative diagram illustrating components of a fluid dispensing system 100 according to one embodiment of the invention. The system 100 includes a fluid dispenser 104 (e.g., a peristaltic pump), a motor 106 or other actuator to operate the fluid dispenser 104, and a controller 108 that allows control of the motor's 106 speed. The controller 108 can be any known processor, actuator control, and/or motor control device that can adjust motor or actuator speed via a generated control signal, such as a pulse width modulated signal, a variable voltage signal, etc. Changes in the motor speed will change the operation speed of the dispenser 108.

In one embodiment, the controller 108 includes an actuator control 109 and a memory 110 that is able to store data on fluid dispensing times and corresponding motor speeds and/or dispensing speeds as well as functions or algorithms linking dispensing speeds, times and volumes. Note that the memory 110 does not necessarily have to be part of the controller 108; the memory 110 can be any data storage device incorporated anywhere into the system 100 as long as it communicates with the actuator control 109.

Adjusting the motor speed adjusts the flow rate of the fluid dispenser 104, thereby varying the volume of fluid output by the dispenser 104 over a given time period. The controller 108 allows the motor speed, and therefore the flow rate of the fluid dispenser 104, to be varied without requiring manual iterative adjustments.

Figure 2:
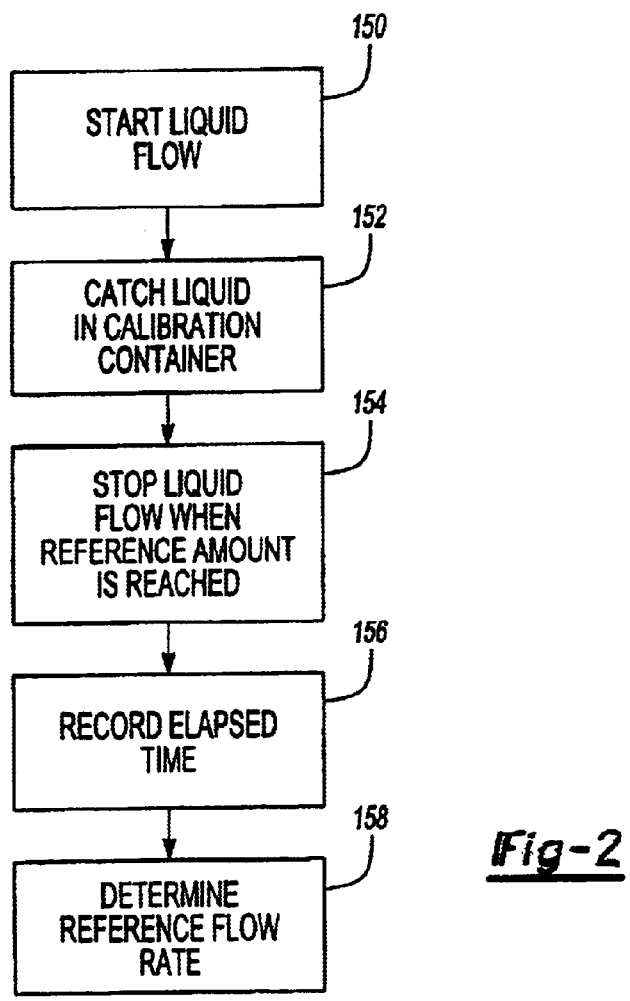
FIG. 2 is a flow diagram illustrating a calibration method for a fluid dispensing system according to one embodiment of the invention.

In one embodiment, the system 100 also includes a flow start/stop switch 111 that allows the user to start and stop fluid dispensing manually. FIG. 2 is a flow diagram illustrating one way in which the system of FIG. 1 is initially set up to conduct automatic calibration. The user starts fluid flow by activating the switch 111 (block 150) and allows the fluid to flow into a calibration container (block 152). When the dispensed fluid reaches a selected reference volume (e.g., 1 ounce), the user stops fluid flow via the switch 111 (block 154). The controller 108 or other processing device records the elapsed time for obtaining the reference volume (block 156). Because the reference volume, the time for dispensing the reference volume (i.e., a reference time), and the ideal or actual motor speed are all known (from the input voltage applied to the motor), a reference flow rate can be calculated for a given motor speed (block 158). Calculating a reference flow rate in this way is simpler than iteratively adjusting the motor speed based on a difference between a dispensed volume and a desired volume because the reference flow rate can be obtained from a single user-controlled dispensing operation.

In one embodiment, there is a generally linear relationship between the volume of fluid dispensed and the motor speed. This relationship allows the controller 108 to compute a revised motor speed by correcting the motor speed used during calibration by a scaling factor proportional to the difference between an actual dispensing time for a given reference volume and the target dispensing time.

In one embodiment, the controller 108 may use a compensator to compensate for any non-linearities in a given motor's particular characteristics (e.g., the relationship between the flow rate and a control voltage applied to the motor 106 by the controller 108, system changes, changes in the conduit carrying the fluid, conduit wear, etc.) as well as changes in the fluid itself (e.g., fluid viscosity). The compensator may be a circuit configuration, such as a closed-loop circuit, or be incorporated into the function executed by the controller 108. Regardless of the specific way the compensator is incorporated into the system 100, the compensator acts as a correction factor to maintain linearity in the motor's characteristics, maintaining accuracy in the automatic calibration.

Figure 3:
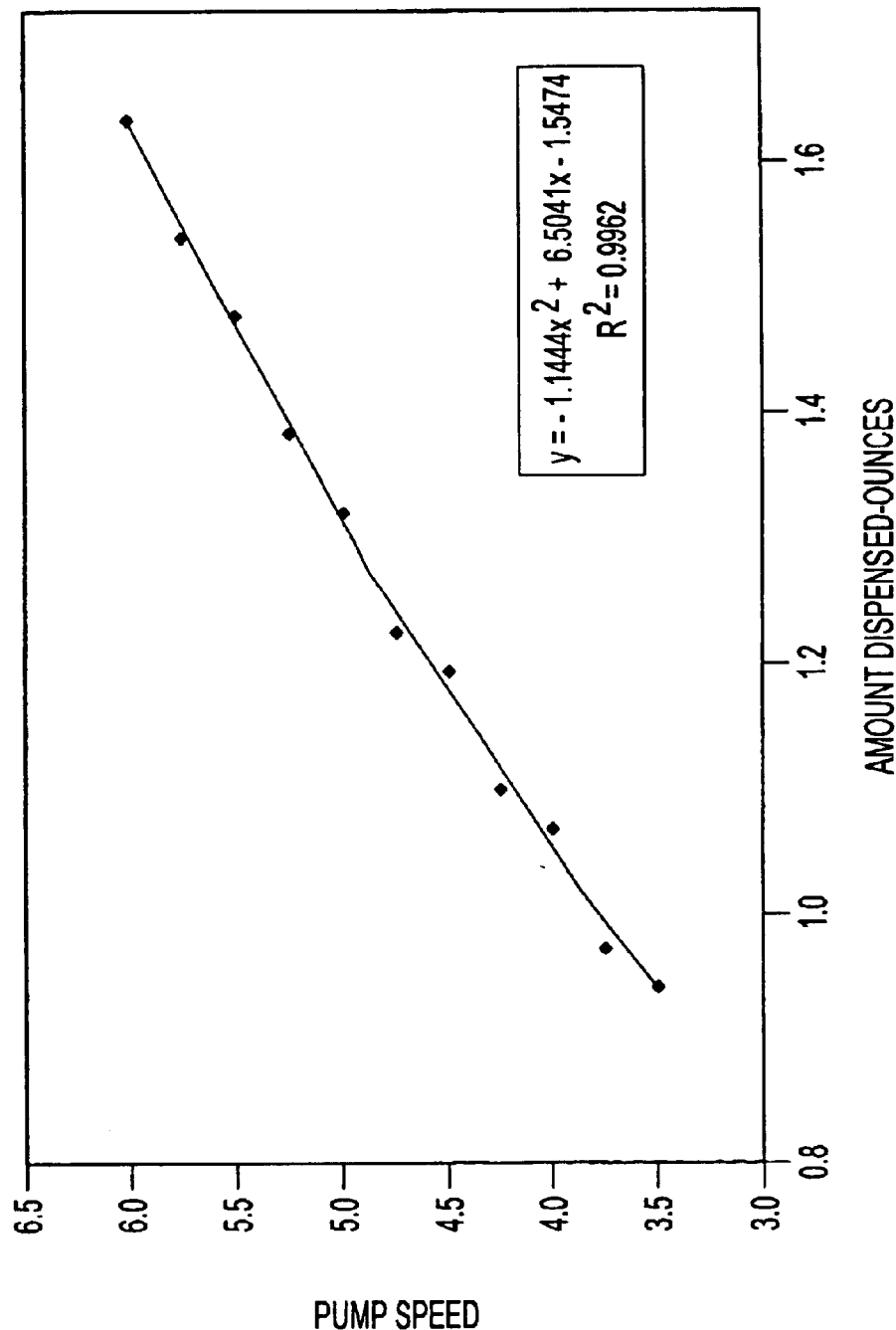
FIG. 3 is a plot of a dispensing speed versus an volume of fluid dispensed during a fixed time period.
Figure 4:
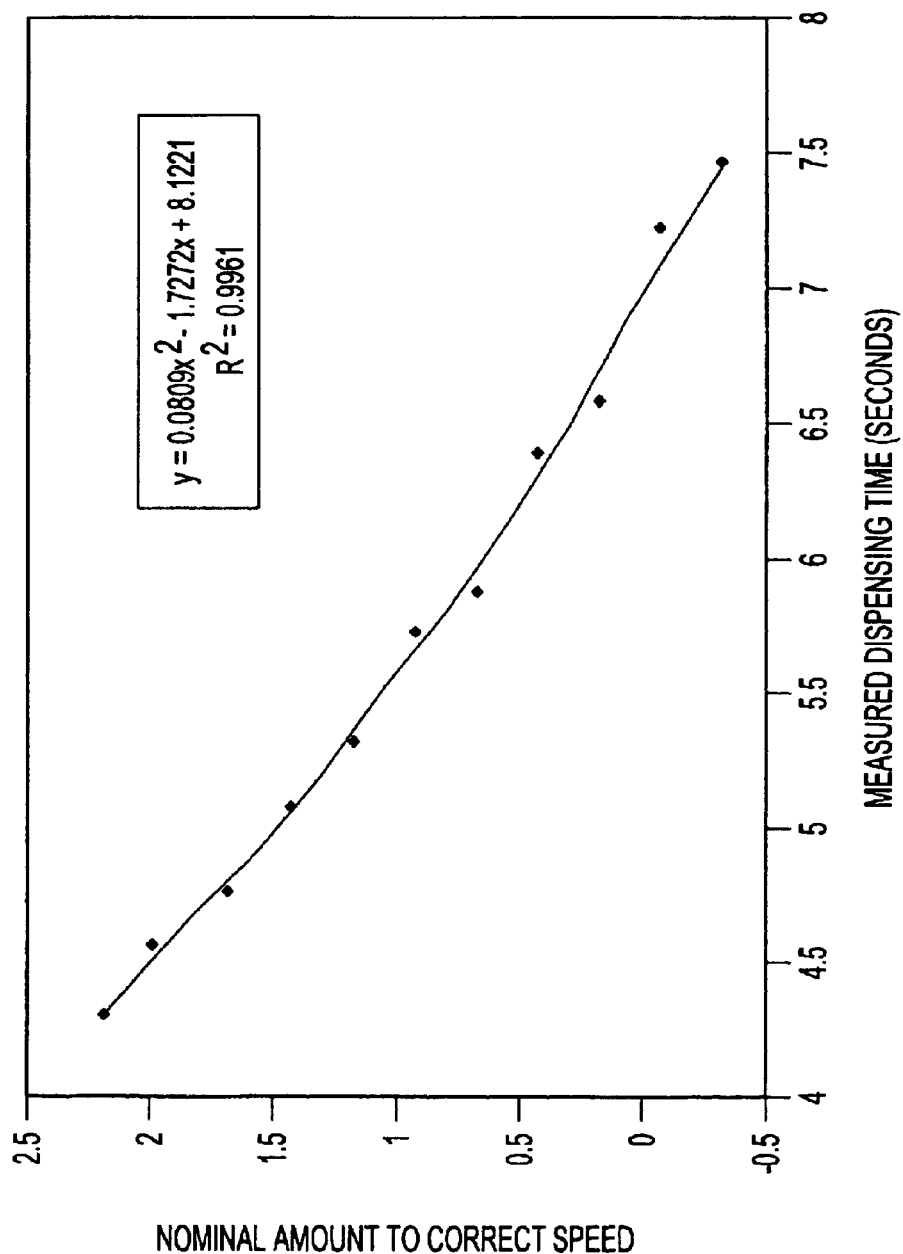
FIG. 4 is a plot of a dispensing speed correction amount versus a time period for dispensing a fixed volume of fluid at a speed corresponding to the correction amount.

FIGS. 3 and 4 and Table 1 below illustrate one method of obtaining the transfer function used by the controller 108 for calibration. Note that the function used by the controller 108 may be determined in ways other than the method described below. Further, the function may be a linear function or even simply a proportional factor, depending on the desired motor speed adjustment. In one embodiment, fluid samples are dispensed during a specific time period, such as the target time period (e.g., 7 seconds). Table 1 illustrates relationships between the dispensing speed and the volume of fluid dispensed during the target time period. The data shown in Table 1 are for illustrative purposes only to explain the operation of the inventive system and are not meant to be limiting in any way.

The data shown in Table 1 can then be plotted, as shown in FIGS. 3 and 4, with a transfer function being automatically generated using any known program based on the plots. FIG. 3 is a plot of the dispensing speed versus the volume of fluid dispensed during the fixed target time, while FIG. 4 is a plot of the correction amount versus the time needed to dispense 1 ounce at the speed corresponding to that correction amount.

From the data obtained above, the controller 108 can automatically-calculate and adjust the motor speed to produce a desired volume of fluid when the user enters a target dispensing time into the system 100. More particularly, the initial calibration sequence shown in FIG. 2 provides the system 100 with a reference flow rate and an initial dispensing time. Because the target dispensing time is known for most applications, adjusting and calibrating the motor speed in the inventive manner ensures that the fluid dispenser 104 will be able to dispense the desired volume of fluid in the selected target dispensing time (e.g., 7 seconds).

For example, if the fluid is to be mixed with another material having a given flow rate, the initial calibration steps provide a reference flow rate that can be coordinated with the flow rate of the other material during calibration. If the flow rate of the fluid needs to be increased or decreased to coordinate with the flow rate of the other material, the reference flow rate provides an anchor point for determining the linear relationship between the flow rate and dispenser speed for that particular fluid and determining a target fluid dispensing time corresponding with the dispensing time of the other material. Based on this information, the controller 108 can determine the proper speed for outputting the target fluid volume in the target dispensing time.

Using the function generated according to FIGS. 3 and 4, the controller 108 enters the time measured by the controller 108 during the initial calibration process to determine how

TABLE 1

| Dispenser Speed (input V) | Measured Volume (ounces) | Correction Amount Computed to Correct the Speed to Reference Speed | Computed Time to Dispense One Ounce at this speed |
| --- | --- | --- | --- |
| 6.00 | 1-5/8 | 2.19 | 4.31 |
| 5.75 | 1-17/32 | 1.94 | 4.57 |
| 5.50 | 1-15/32 | 1.69 | 4.77 |
| 5.25 | 1-3/8 | 1.44 | 5.09 |
| 5.00 | 1-5/16 | 1.19 | 5.33 |
| 4.75 | 1-7/32 | 0.94 | 5.74 |
| 4.50 | 1-3/16 | 0.69 | 5.89 |
| 4.25 | 1-3/32 | 0.44 | 6.40 |
| 4.00 | 1-1/16 | 0.19 | 6.59 |
| 3.75 | 31/32 | −0.06 | 7.23 |
| 3.50 | 15/16 | −0.31 | 7.47 |

The actual dispensing speed and dispensed volume is then compared with the reference dispensing speed (e.g., 3.81V) and the reference dispensed volume (e.g., 1 ounce), and a speed correction amount is calculated based in the difference between the actual dispensing speed and the reference dispensing speed. A time period for dispensing 1 ounce at the actual dispensing speed is then calculated. For example, if the actual dispensing speed is 5.75V and 1.53 ounces were dispensed in 7 seconds at this speed, then the speed correction amount is 1.94V (that is, 1.94V needs to be subtracted from the actual speed of 5.75V to obtain the ideal speed of 3.81V). Further, as can be seen in Table 1, a dispensing speed of 5.75V will dispense 1 ounce in 4.57 seconds.

much the motor speed needs to be adjusted to dispense the reference volume in the target time. For example, if during calibration process shown in FIG. 2, it took 4.57 seconds to dispense 1 ounce of fluid, it indicates that the dispenser speed is 5.75V, 1.94V higher than the ideal speed of 3.81V. The controller 108 will then reduce the dispenser speed by 1.94V automatically so that 1 ounce will be dispensed during the target time of 7 seconds. The controller 108 will therefore cause the motor 106 to converge to the ideal speed, dispensing the target volume during the target time, regardless of the initial speed of the motor during the calibration step of FIG. 2.

Thus, rather than relying on iterative manual adjustments to calibrate the motor 106 and therefore the dispenser 104, the system 100 can detect the amount of adjustment needed based on the time it takes to dispense a fixed volume of fluid during the initial calibration process (FIG. 2). For example, given a selected target dispensing time, the controller 108 can calculate the difference between the target time and the reference time and then vary the motor speed by an amount proportional to the size of the calculated difference. The specific proportional values depends on the specific characteristics of the motor, fluids, and/or conduits being used; those of ordinary skill in the art will be able to determine the correct scaling factor for a given system via trial and error without undue experimentation. Because the ideal or actual motor speed is known, a relationship between the motor speed and dispensing time can be determined. As a result, the controller 108 can automatically detect how far the dispensing speed, and therefore the motor speed, is off from the target speed and adjust the motor speed accordingly.

Further, if the user wants to dispense the selected volume of fluid in a shorter time period, the motor speed is able to automatically adjust itself based on the transfer function reflecting the relationship between motor speed and dispensing time for a given fluid volume. Because the transfer functions used by the controller 108 links dispenser speed, dispensing time, and dispensed volume, those of ordinary skill in the art will be able to determine other ways in which the transfer function can be used for automatic calibration of fluid dispensers 104 (e.g., calibrating to a fixed dispensed volume, a specific motor speed, etc. as well as to a target dispensing time) without departing from the scope of the invention. The functions or algorithms stored in the controller 108 allows automatic adjustment of the motor speed to meet any desired performance characteristics based on a single reference flow rate obtained during an initial calibration step (FIG. 2).

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A fluid calibration system, comprising:
    a fluid dispenser;
    an actuator coupled to the fluid dispenser that controls output of a fluid from the fluid dispenser; and
    an actuator control coupled to the actuator, wherein the actuator control automatically adjusts the actuator based on a difference between an actual dispensing characteristic and an ideal dispensing characteristic and according to a function correlating fluid dispensing time, dispensing speed and dispensed volume and obtained from a plurality of dispensed volumes over a plurality of dispenser speeds, wherein each dispenser speed corresponds to one of said plurality of dispensed volumes, and wherein a desired time to dispense a desired amount of the fluid is entered to said actuator control, said actuator control then controlling said actuator to achieve said desired amount of the fluid in said desired time.

2. The fluid calibration system of claim 1, wherein the actuator is a motor.

3. The fluid calibration system of claim 1, wherein the function used by the actuator control is a relationship between a dispenser speed correction amount and a calculated dispensing time for dispensing a target dispensed volume, wherein each of said plurality of dispenser speeds has a corresponding dispenser speed correction amount and calculated dispensing time.

4. The fluid calibration system of claim 3, wherein the actual dispensing characteristic and the ideal dispensing characteristic are an actual dispensing speed and ideal dispensing speed, respectively, and wherein the actuator control selects a dispenser speed correction amount based on the actual dispensing speed and automatically adjusts the actuator based on the dispenser speed correction amount to obtain the ideal dispensing speed.

5. The fluid calibration system of claim 4, wherein the actual dispensing speed is determined by obtaining an elapsed time for obtaining the target dispensed volume.

6. The fluid calibration system of claim 1, wherein the actual dispensing characteristic and the ideal dispensing characteristic are an actual dispensing speed and ideal dispensing speed, respectively, and wherein the actuator control adjusts the actuator by determining a difference between an actual dispensing speed and an ideal dispensing speed and automatically adjusting the actuator from the actual dispensing speed to the ideal dispensing speed.

7. The fluid calibration system of claim 1, wherein the actual dispensing characteristic and the ideal dispensing characteristic are an actual flow rate and an ideal flow rate, respectively.

8. The fluid calibration system of claim 1, further comprising a memory accessible by the actuator control.

9. The fluid calibration of claim 8, wherein the actuator control and the memory together form a controller that controls the actuator.

10. A fluid calibration system, comprising:
    a fluid dispenser;
    a motor coupled to the fluid dispenser that controls output of a fluid from the fluid dispenser;
    a motor control coupled to the actuator, wherein the motor control automatically adjusts the motor based on a difference between an actual dispensing speed and an ideal dispensing speed according to a function based on a plurality of fluid dispensing times, a plurality of dispensing speeds, and a plurality of dispensed volumes, wherein the actual dispensing speed is determined by obtaining an elapsed time for obtaining a target dispensed volume, and wherein a desired time to dispense a desired amount of the fluid is entered to said actuator control, said actuator control then controlling said actuator to achieve said desired amount of the fluid in said desired time; and
    a memory accessible by the motor control and used to determine how to achieve said desired amount of the fluid in desired time.

11. The fluid calibration system of claim 10, wherein the function used by the motor control is obtained from a plurality of dispensed volumes over the plurality of dispenser speeds and is a relationship between a dispenser speed correction amount and a calculated dispensing time for dispensing the target dispensed volume, wherein each of said plurality of dispensing speeds has a corresponding dispenser speed correction amount and calculated dispensing time.

12. The fluid calibration system of claim 11, wherein the actuator control selects a dispenser speed correction amount based on the actual dispensing speed and automatically adjusts the actuator based on the dispenser speed correction amount to obtain the ideal dispensing speed.

13. A method for calibrating a fluid dispensing system, comprising the steps of:
    detecting an actual dispensing characteristic of a fluid dispenser controlled by an actuator;

determining a difference between the actual dispensing characteristic and an ideal dispensing characteristic; and controlling the actuator based on the determined difference and according to a function based on a plurality of fluid dispensing times, a plurality of dispensing speeds, and a plurality of dispensed volumes to obtain the ideal dispensing characteristic, and entering a desired time to dispense a desired amount of the fluid to said actuator control, said actuator control then controlling said actuator to achieve said desired amount of the fluid in said desired time.

14. The method of claim 13, wherein the act of detecting an actual dispensing characteristic comprises detecting an elapsed time for obtaining a target volume.

15. The method of claim 13, further comprising determining a relationship between a dispenser speed correction amount and a calculated dispensing time for dispensing a target dispensed volume to obtain the function, wherein each of said plurality of dispenser speeds has a corresponding dispenser speed correction amount and calculated dispensing time.

16. The method of claim 13, wherein the actual dispensing characteristic and the ideal dispensing characteristic are an actual dispensing speed and ideal dispensing speed, respectively.

17. The method of claim 13, wherein the actual dispensing characteristic and the ideal dispensing characteristic are an actual flow rate and an ideal flow rate, respectively.

* * * * *